June 4, 1957 R. G. RIEDESEL ET AL 2,794,726
ENDLESS ABRASIVE ARTICLE
Filed Nov. 19, 1949
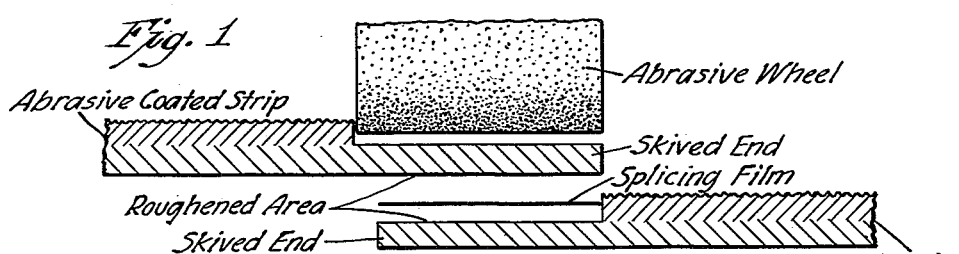
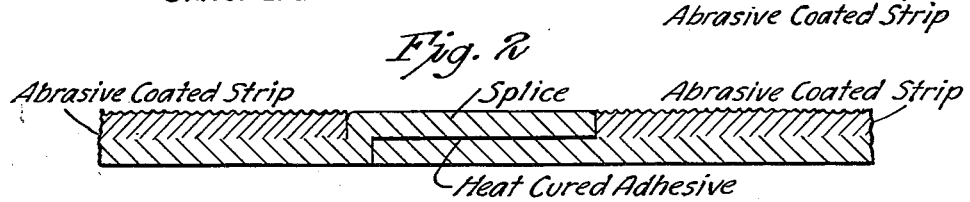
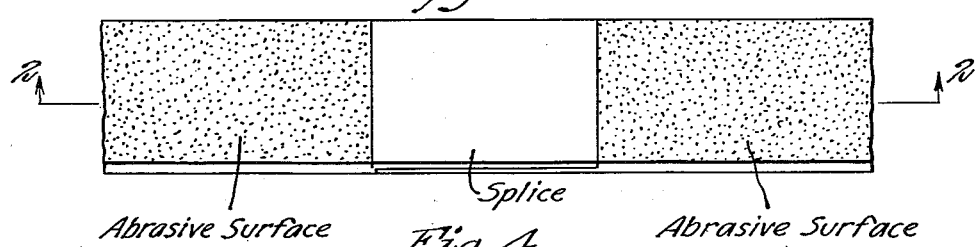
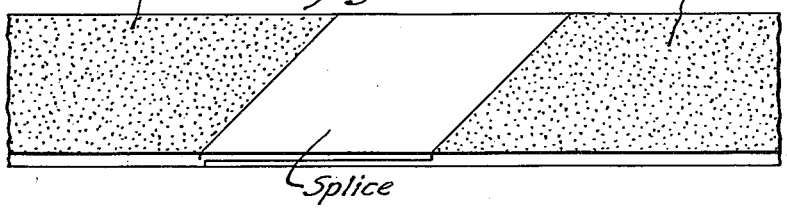
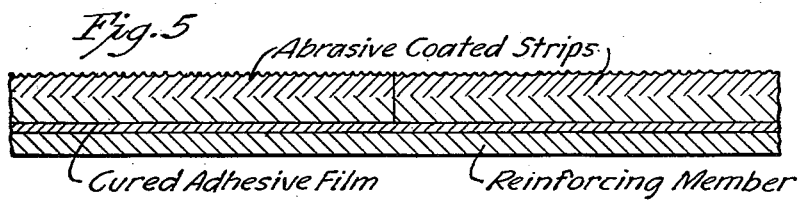
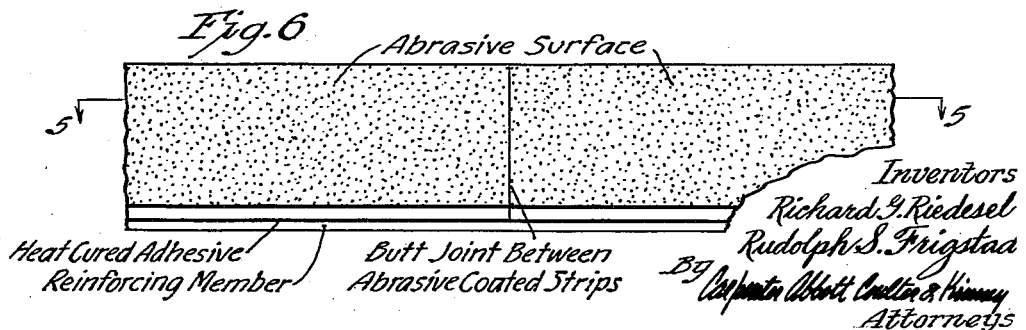
Inventors
Richard G. Riedesel
Rudolph S. Frigstad
By Carpenter Abbott Coulter & Kinney
Attorneys

United States Patent Office 2,794,726
Patented June 4, 1957

2,794,726
ENDLESS ABRASIVE ARTICLE

Richard G. Riedesel and Rudolph S. Frigstad, St. Paul, Minn., assignors to Minnesota Mining & Manufacturing Company, St. Paul, Minn., a corporation of Delaware Application November 19, 1949, Serial No. 128,299

5 Claims. (Cl. 51—297)

This invention relates to endless abrasive articles and more particularly to the splicing of abrasive belts. It is particularly concerned with abrasive belt splices formed with a temporarily thermoplatic, heat-setting adhesive in self-supporting film form.

Abrasive belts are customarily made by adhering together the skived ends of strips of coated abrasive sheet material. The adhesive employed for such operations has heretofore generally been of the solvent type, applied by brushing of the liquid adhesive onto the skived ends. After partial evaporation of the solvent, these coated surfaces are pressed together, with heating and drying where necessary, to provide the completed splice or joint.

Where glue or other water-soluble material is employed as the abrasive binder in the abrasive-coated sheet material, it is customary to use a water solution of animal glue as the splicing adhesive. Where resinous or water-insoluble abrasive binders are employed, resinous types of adhesives are used. Such materials as plasticized urea-formaldehyde resins, phenol-aldehyde resins and other water-insoluble resinous adhesives dissolved in suitable organic solvents, have been employed for this purpose.

The application of adhesives in liquid form, requiring subsequent removal of solvent, is obviously an undesirable method. If thin, easily-spreadable adhesive solutions are used, a large number of coats are required to produce the necessary thickness of adhesive, and the operation becomes impossibly time-consuming. Hence more concentrated, viscous solutions are invariably used. But these solutions do not spread evenly, and the dried adhesive layer is found to be of uneven thickness. Nevertheless, prior to the present invention such methods, and the useful but not completely successful products thus obtained, have in the absence of any superior methods and products been generally accepted in the abrasive belt industry.

Abrasive belt splices heretofore known have given good results in many applications, but in some cases have been found to be deficient in flexibility, particularly in the case of especially thin and flexible abrasive sheet material. It has been frequently observed, for example, that the conventional type of splice made with the solvent type adhesive as heretofore described will open up when the belt is drawn at high speeds around pulleys of small diameter during use. On the other hand, abrasive belt splices made with more flexible adhesive compositions have not been sufficiently high in strength, particularly since high temperatures normally generated in the belt during the abrading process cause softening of such adhesives.

The use of pre-formed films in the joining of various materials including such items as cloth belts has previously been suggested. For example, it has been suggested that a solvent-softened film of cellulose nitrate may be placed between the overlapped ends of a strip of porous fabric belting and the whole pressed together to form a completed splice. The application of a solvent type cement, such as a solution of cellulose nitrate, to the fabric prior to positioning of the cellulosic film is said to provide an improved splice. But such splices are thermoplastic and hence are of no value in abrasive belt usage, where relatively high temperatures combined with high tensile stresses soon cause failure of the splice. Other previously available adhesive films were similarly thermoplastic, or required too high an activating temperature, or too high a temperature and too long a time for curing, or were either rapidly self-curing at normal room temperatures or non-curing at acceptable elevated temperatures, or were brittle or weak in cured form, or were otherwise defective in one way or another for service as abrasive belt splicing media. Hence no one prior to our invention has ever, to the best of our knowledge, produced spliced abrasive belts using pre-formed self-supporting dry adhesive films to provide the improved results herewith made available to the art.

An object of the present invention is the provision of a spliced abrasive belt which is flexible and may be operated over pulleys of small diameter without opening the splice, and which has an initially high tensile strength and maintains such strength throughout the useful life of the belt and at high abrading temperatures. Another object of the invention is the provision of a flexible, strong and heat-resistant spliced abrasive belt by an improved method.

We achieve these and other objects and advantages by employing as the splicing medium a temporarily thermoplastic, adherent, rapidly heat-curing, flexible, self-supporting adhesive film, all as hereinafter further identified.

Two different types of abrasive belt splices made in accordance with our invention are illustrated in the drawing, in which Figure 1 is a vertical sectional view showing the components of the splice as well as illustrating the skiving operation;

Figure 2 is a vertical sectional view of the completed splice, taken at section 2—2 of Figure 3;

Figure 3 is a view of the completed splice in perspective;

Figure 4 is a view in perspective of another form of the overlap splice of Figure 3 in which the splice is at an angle to the length of the strip, and Figures 5 and 6 represent vertical sectional views and perspective views, respectively, of a different type of splice in which the ends of the abrasive strip are butted together without overlap and are held in place by an adherently attached reinforcing strip.

In forming a splice as shown in Figures 1–4, the coated abrasive portion is first removed, as by grinding with an abrasive wheel, from the end portions of the abrasive-coated strip. Since such grinding sometimes produces a glaze on the surface of the remaining portion, this surface of the lower strip is then roughened, as by belt sanding or by sand-blasting. Preferably, the reverse side of the upper strip is also roughened or lightly abraded so as to provide a better surface for subsequent bonding. The splicing film is then placed between the two roughened areas and the assembly pressed between flat platens and briefly heated to form the finished lap-splice structure illustrated in Figures 2 and 3, or the variation shown in Figure 4.

In forming a butt splice as in Figures 5 and 6, the back surfaces of the end areas of the abrasive-coated strip are first roughened and are butted together. A section of the splicing film and a coextensive section of a suitable reinforcing member, e. g. fabric, paper, etc., are then placed over the roughened areas and the splice is completed under heat and pressure. For greater convenience, the film may preliminarily be lightly heat-bonded to the reinforcing sheet. Alternatively, the adhesive solution may initially be applied as a coating on the reinforcing member and dried thereon at room temperature to a smooth surface.

The following examples give in some detail the preparation of a typical splicing film suitable for the purposes of this invention, and describe the application of such film to the splicing of abrasive-coated strip material in the making of endless abrasive belts.

Example 1

|  | Parts |
|---|---|
| Butadiene-acrylonitrile rubbery polymer | 100 |
| Zinc oxide | 10 |
| Oil-soluble heat-advancing phenol-aldehyde resin | 50 |
| "Vinsol" ester gum | 50 |
| Salicylic acid ("Retarder W") | 15 |
| Acetone | 410 |
| 2,6-dibromomethyl-4-methylphenol | 3 |

The rubbery polymer was first softened on a rubber mill, and the zinc oxide incorporated. The resulting mill batch, together with the remaining ingredients, was dissolved (or finely dispersed) in the acetone, using a simple paddle type stirrer, to form a homogeneous blend. To this blend was then added the 2,6-di-bromomethyl-4-methylphenol. The resulting fluid composition was coated in a thin uniform layer on a temporary carrier sheet, such as polyethylene-coated paper, and dried at room temperature. The dried film was stripped from the carrier sheet. It constituted an example of a self-supporting, normally stable and long-aging, temporarily thermoplastic and heat-activatible, rapidly heat-curing splicing film eminently suitable for making spliced abrasive belts in accordance with this invention.

Example 2

A section of abrasive belt stock consisting of abrasive grit bonded with a heat-cured synthetic resin binder to a cloth backing impregnated with a thermoplastic waterproof synthetic resin, representing a type of material commonly used in the industry in the belt sanding of glass and the like, was prepared for splicing into a belt by skiving the diagonally cut ends with an abrasive wheel and by lightly roughening the skived area of one and the reverse area of the other end portion by sandblasting, as illustrated in Figure 1 of the drawing. A section of the splicing film of Example 1, cut to fit the areas to be joined, was placed between the two roughened surfaces, as indicated in the figure, and the assembly was placed in a press between heated platens held at 355°–385° F. It was first held in the press for 10 seconds at a light pressure of about 200 lbs./sq. in. in order to warm up the abrasive strip and to soften the adhesive film. Pressure was then increased to approximately 3000 lbs./sq. in. for 15 seconds. The film softened and flowed into full adhesive contact with the backing, and then heat-cured (vulcanized) to a non-thermoplastic, insoluble but still flexible state. The resulting splice or joint was strong and flexible.

The endless abrasive belt so produced was operated on a belt-sanding machine and was found to outlast belts spliced by conventional means, i. e. with heat-curing phenolic resin applied from solution, and to run smoothly without chattering.

Example 3

A strip of abrasive belt stock consisting of abrasive grit bonded to a filled cloth backing with animal glue was skived and spliced as in Example 2 to produce a strong, flexible splice which could not be ripped apart by hand and which did not lift or open up when the belt was tested under actual operating conditions around small-diameter pulleys to ultimate failure. Splices made in such belt stock with animal glue adhesive require at least 24 hours curing time before they can be used, and even then can be ripped apart by hand. Resinous solvent-type adhesives have in general been ineffective as splicing adhesives for glue bonded abrasive-coated belt stock.

Example 4

The ends of an abrasive-coated strip of belt stock such as was used in Example 2 were fitted together to form a butt joint. On the back or non-abrasive side of this joint was then placed a strip of the film material of Example 1, followed by a strip of thin strong fabric, and the composite was hot-pressed as in Example 2. Such a splice is adequately strong, flexible and heat-resistant, and is relatively simple to produce, but is less desirable for most applications because of the increased thickness at the splice area. This condition may be overcome, particularly with short belts, cones, caps or the like, by covering the entire inner face of the article with the adhesive film and reinforcing cloth. For long fabric belts, a splice having the same thickness as the belt stock may be made by first applying the adhesive film and then, with suitable heat and pressure, pressing a wire screen into the adhesive film and fabric backing and across the juncture, as disclosed in the Miller and Riedesel Patent No. 2,391,731. The film adhesive of Example 1 provides an improved means of bonding such a screen and results in an improved splice. With such adhesive film, fully adequate splices may be made with abrasive-coated sheet material having either a resin bond or a glue bond.

The self-supporting dried adhesive film of Example 1 was about 3 mils thick, and in general we prefer to employ films within the range of about 2–8 mils thickness. Thinner film sometimes do not completely contact all surfaces of the skived areas. Thicker films either undesirably increase the thickness of the splice or result in flowing of a portion of the composition beyond the edges of the skived areas. Thickness of the film also is regulated to some extent by the size of the abrasive grit and thickness of the backing, heavier abrasive sheets requiring thicker films. Thicker films, as well as heavier backings, frequently require somewhat longer periods of pre-heating. Larger abrasive grit sizes, with correspondingly heavier backings and bonds, require longer heat-curing; for example, grit 50 may require from 5 to 10 seconds longer cure at 3000 lbs./sq. in. than is required with grit 120.

The particular rubbery polymer employed in the composition of Example 1 was a copolymer of about 70 parts of butadiene and 30 parts of acrylonitrile. Other proportions may also be successfully employed. A considerable percentage of acrylonitrile or equivlent in making the polymer appears to be essential, but too high a proportion of acrylonitrile produces a stiff, boardy polymer which is hard to mill and to dissolve. In general, the range of 20–40 percent of acrylonitrile is preferred; within this approximate range, the polymers are rubbery and provide excellent properties in the adhesive film. Small amounts of other copolymerizable monomers may be polymerized with the butadiene and acrylonitrile, or may be substituted for a portion of a principal monomer; for example, isoprene may be incorporated in small proportions.

Phenolic resins prepared by the alkali-catalyzed condensation of about 1.2–1.6 mols of an aldehyde such as formaldehyde with one mole of a substituted phenol such as a para-substituted alkyl or aryl phenol, e. g. para-tertiary-amyl phenol, have given excellent results in these compositions. This class of resins is well-known to the art as oil-soluble, heat-advancing or heat-reactive, 100% phenol-aldehyde resins, and is represented by many commercially available resins such as "Super-Beckacite 1003."

"Vinsol" ester gum is the glycerol ester of "Vinsol" resin, an acidic extract of pine wood which is substantially insoluble in light petroleum hydrocarbons. It represents a preferred neutral modifying resin for the blend of rubbery polymer and reactive phenolic resin. "Vinsol" ester gum, or other equivalent hard, neutral, thermoplastic resin improves the heat-bonding properties of the film, and also improves the firmness of the bond or splice obtainable with the film. This relatively inexpensive resinous component also reduces the over-all raw materials cost of the film. "Vinsol" ester gum may be replaced for our purposes by acetone-soluble phenolic resins, such as "Durez 240" and "Varcum 5485," as well as other equivalent resins.

Plasticizers, e. g. dibutyl phthalate, have been incorporated in limited amounts into these film-forming compositions where greater flexibility was desired.

Compounds such as 2,6-di-bromomethyl-4-methylphenol have been shown to act as vulcanizing agents for crude rubber, the reaction being due to the formation of a reactive methylene quinone on heating of the composition. The quinone then reacts with active hydrogen atoms of the rubber molecule to form an addition compound. The reaction is described in the thesis of S. Van Der Meer, originally published in Delft, 1943; see also Chemical Abstracts, volume 39, page 3961.

The Van Der Meer paper describes a large number of phenol-alcohols and their halogen derivatives which are decomposable to provide methylene quinone and are applicable to the vulcanization of rubber. While in general the compounds there described are found to have value in our film compositions, it has been found, contrary to the implications of the Van Der Meer thesis, that the halogenated materials are much superior to the hydroxy compounds for the purposes of our invention. Thus the phenol-alcohols, e. g. 2,6-di-hydroxymethyl-4-methylphenol, require extreme caution in their use in such films, since they tend to cause reduced stability of the dried film and to result in inferior adhesion to the backing of the abrasive-coated strip. Of the halogenated compounds, the chloro derivatives, e. g. 2,6-di-chloromethyl-4-methylphenol, appear to be unnecessarily reactive and tend to cause scorching of the film. When the brominated compounds, and particularly 2,6-di-bromomethyl-4-methylphenol, are employed as organic heat-curing agents, these adhesive film products are found to be readily manufactured, normally stable, and rapidly activated and vulcanized. Abrasive belts spliced with such film are strong, flexible and uniform, and provide improved performance over belts spliced with other adhesive bonds known to us.

While we greatly prefer to employ film materials made in accordance with the specific formula and procedure of Example 1, we find that abrasive belt splices made with film materials of various modified formulas also show desirable improvement over prior art splices. Thus the proportions of the specific ingredients of Example 1, or of equivalent materials such as are herein elsewhere noted, may be quite widely varied while still retaining the desired flexibility, adhesion, high strength, solvent resistance, absence of heat-softening, rapidity of cure, and other properties of the product.

It will be apparent that we have invented a new and highly advantageous type of splice or joint for abrasive belts and other sheet materials. While we have of necessity described our invention in terms of specific embodiments thereof, nevertheless we do not desire to be limited thereto, but rather we claim as coming within the scope of our invention such range of equivalents as the nature of the invention and the prior art permits.

What we claim is:

1. Method of splicing coated abrasive sheet material in making continuous abrasive belts or the like, comprising assembling the portions to be spliced in reinforcing relationship and including an intercalated thin solvent-free, strong and self-supporting, flexible, rapidly heat-curing, heat-activated adhesive splicing film, briefly heating the assembly under low pressure to soften the film, and continuing the heating with the application of increased pressure whereby to secure self-bonding of the film to the contiguous surfaces and to heat-cure the film, said film being a blend of ingredients comprising a rubbery butadiene-acrylonitrile polymer, an oil-soluble heat-reactive phenol-aldehyde resin, and a monomeric methylene-quinone-liberating substituted phenol vulcanizing agent.

2. Method of joining coated abrasive sheet material in making abrasive belts, cones, etc., comprising the steps of skiving the adjacent edges, placing the skived surfaces in overlapping fitted position and interposing therebetween a thin, solvent-free, strong and self-supporting, flexible, rapidly heat-curing, heat-activated adhesive splicing film, briefly heating the assembly under low pressure to soften the film, and continuing the heating with the application of increased pressure whereby to secure self-bonding of the film to said skived surfaces and to heat-cure the film, said film being a blend of ingredients comprising a rubbery butadiene-acrylonitrile polymer, a minor proportion of oil-soluble heat-reactive phenol-aldehyde resin, and, as a curing agent, 2,6-di-bromomethyl-4-methylphenol.

3. Method of splicing coated abrasive sheet material in making continuous abrasive belts or the like, comprising assembling the portions to be spliced in reinforcing relationship and including an intercalated thin solvent-free, self-supporting, flexible, rapidly heat-curing, heat-activated adhesive splicing film, heating the assembly for about 10 seconds at about 355–385° F. under a pressure of about 200 lbs./sq. in. to soften the film, and continuing the heating for about 15 seconds under a pressure of about 3000 lbs./sq. in., whereby to secure self-bonding of the film to the contiguous surfaces and to heat-cure the film, said film being a blend of ingredients comprising 100 parts of a rubbery butadiene-acrylonitrile polymer, about 50 parts of an oil-soluble heat-reactive phenol-aldehyde resin, and about 3 parts of 2,6-di-bromomethyl-4-methylphenol.

4. The method of claim 3 in which the blend of ingredients comprising the film includes about 50 parts of hard, neutral, thermoplastic resin.

5. The method of claim 1 in which the methylene-quinone-liberating substituted phenol is a di-halomethyl alkyl phenol having the halomethyl groups ortho to the phenolic hydroxyl.

References Cited in the file of this patent

UNITED STATES PATENTS

| | | |
|---|---|---|
| 2,060,906 | Snyder | Nov. 17, 1936 |
| 2,229,880 | Allison | Jan. 28, 1941 |
| 2,376,854 | Saunders | May 22, 1945 |
| 2,431,035 | Goepfert et al. | Nov. 18, 1947 |
| 2,445,807 | Summers et al. | July 27, 1948 |
| 2,537,982 | Finn | Jan. 16, 1951 |

FOREIGN PATENTS

| | | |
|---|---|---|
| 625,845 | Great Britain | July 5, 1949 |